US008126875B2

(12) United States Patent
Liu et al.

(10) Patent No.: US 8,126,875 B2

(45) Date of Patent: Feb. 28, 2012

(54) INSTANT ANSWERS AND INTEGRATED RESULTS OF A BROWSER

(75) Inventors: Yin Liu, Sammamish, WA (US); Beatrice Daniela Oltean, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 340 days.

(21) Appl. No.: 12/463,079

(22) Filed: May 8, 2009

(65) Prior Publication Data

US 2010/0287170 A1 Nov. 11, 2010

(51) Int. Cl.

*G06F 7/00* (2006.01)

*G06F 17/30* (2006.01)

(52) U.S. Cl. ........ 707/721; 707/765; 707/766; 707/768; 709/203; 709/217; 715/780; 715/781

(58) Field of Classification Search .................. 707/721, 707/765, 766, 768, 759, 769, 783, 706; 709/203, 709/217; 715/780–781

See application file for complete search history.

(56) References Cited

U.S. PATENT DOCUMENTS 6,144,958 A * 11/2000 Ortega et al. .......... 707/999.005
7,487,144 B2 2/2009 Shakib
2001/0042109 A1 * 11/2001 Bolas et al. ................... 709/219
2004/0143569 A1 * 7/2004 Gross et al. ....................... 707/3
2005/0015500 A1 * 1/2005 Batchu et al. ................. 709/228
2006/0129541 A1 * 6/2006 Morgan et al. .................... 707/3
2006/0248078 A1 11/2006 Gross
2007/0088686 A1 4/2007 Hurst-Hiller
2007/0191485 A1 * 8/2007 Kohchi et al. ................. 514/588
2007/0220447 A1 9/2007 Ray
2007/0233646 A1 * 10/2007 Sauve et al. ........................ 707/3
2008/0021721 A1 * 1/2008 Jones et al. ....................... 705/1
2008/0109401 A1 5/2008 Sareen
2008/0109752 A1 * 5/2008 Bayley et al. ................. 715/800
2008/0114761 A1 * 5/2008 Gross et al. ....................... 707/6
2008/0126477 A1 * 5/2008 Kim .............................. 709/203
2008/0177708 A1 * 7/2008 Ayyar et al. ....................... 707/3
2008/0214155 A1 * 9/2008 Ramer et al. ............... 455/414.1
2008/0294619 A1 * 11/2008 Hamilton et al. ................. 707/5
2009/0006543 A1 * 1/2009 Smit ............................. 709/203
2010/0146012 A1 * 6/2010 Beaudreau et al. ........... 707/803

OTHER PUBLICATIONS

Christiaan Fluit & Aduna BV—"AutoFocus: Semantic Search for the Desktop" proceddings of the Ninth International Conference on Information Visualisation (IV'05) 2005 IEEE, Jul. 6-8, 2005 (pp. 480-487).*

(Continued)

*Primary Examiner* — John E Breene

*Assistant Examiner* — Anh Ly

(74) *Attorney, Agent, or Firm* — Shook, Hardy & Bacon L.L.P.

(57) ABSTRACT

A method, system, and medium are provided for searching multiple search services in parallel and utilizing multiple search providers in a computer system. Multiple search providers are installed onto a browser application of a user computer system. Upon receipt of a user search query and a user designated search provider, an instant answer is automatically displayed without any user interaction. Other aggregated results are displayed together in a combined window pane. One section displays results of any recent searches that match the search query entry. Another section displays search suggestions provided by the designated search provider. Another section displays results of any previously visited sites in which results of the previously visited site match the search entry. Additional searches of different designated search providers can also be made. These multiple searches of multiple search providers are conducted from the same browser window as the initial search.

17 Claims, 11 Drawing Sheets

OTHER PUBLICATIONS

Peter Mika, Edgar Meji and Hugo Zaragoza—"Investigating the Semantic Gap through Query Log Analysis"—Yahoo Research—The Semantic Web—ISWC 2009—Computer Science, 2009 vol. 5823/2009 (pp. 441-455).*

Hood, Stephen. "Yahoo! Search Blog, Instant Search Gives You Instant Answers." http://ysearchblog.com/2005/09/14/instant-search-gives-you-instant-answers/. Sep. 14, 2005.

"Live Search, Instant Answers in your IE8 search box!" http://msdn.technetweb3.orcsweb.com/livesearch/archive/2009/02/03/instant-answers-in-your-ie8-search-box.aspx. Feb. 3, 2009.

Oracle. "Siebel Smart Answer Administration Guide Version 8.0." http://download.oracle.com/docs/cd/B40099_02/books/PDF/SmartAns.pdf. Dec. 2006.

Gonsalves, Antone. "Yahoo Offers 'Instant' Search: Yahoo launches "Instant Search" in beta, a feature that delivers results while typing in a query." http://www.informationweek.com/news/showArticle.jhtml?articleID=185300584. Apr. 11, 2006.

The Peers Bros. "Peers—Instant Search 0.8." https://addons.mozilla.org/en-US/firefox/addon/6589. Jan. 25, 2009.

Microsoft Corporation. "Search Provider Extensibility in Internet Explorer." http://msdn.microsoft.com/en-us/library/cc848862(VS.85).aspx#dev_searchsuggestion. 2009.

* cited by examiner

INSTANT ANSWERS AND INTEGRATED RESULTS OF A BROWSER

BACKGROUND

A web browser is an application which enables a user to communicate with a web server. The web browser enables the display and interaction with text, images, videos, music, games, and other information located on a web page at a website on the World Wide Web (WWW) or a local area network (LAN). Text and images on a web page can contain hyperlinks to other web pages at the same or different website. Web browsers allow a user to quickly and easily access information provided on many web pages at many web sites by traversing these links. Browsers can also be used to access information provided by web servers in private networks or content in file systems.

The number of search engines, which provide search content to users via a web server, is greatly increasing. Surfing multiple search engines requires accessing each individual search engine's website, one at a time, which can be time consuming. In addition, individual search results that are obtained from each search provider are not inter-related, organized, or grouped together with other search results.

SUMMARY

Embodiments of the invention are defined by the claims below. A high-level overview of various embodiments of the invention is provided to introduce a summary of the systems, methods, and media that are further described in the Detailed Description section below. This Summary is neither intended to identify key features or essential features of the claimed subject matter, nor is it intended to be used as an aid in isolation to determine the scope of the claimed subject matter.

Embodiments of the invention include querying multiple search services in parallel to provide an instant answer, along with related search suggestions and previously visited sites. An internal relevance manager determines a most relevant answer by generating a match within the grammar of a supported instant answer to provide a precise answer.

Embodiments of the invention also utilize multiple search providers from a single browser window. Multiple search providers are selected by a user and installed onto a browser application of a user computer system. Upon receipt of a user search query and a user designated search provider, the domain of that search provider is searched. Results from the search query are returned to the user. Results contain an instant answer of the most relevant result, along with one or more related searches.

Selection of a second designated search provider can also be made. The domain of the second designated search provider is searched, and results from the second search are returned to the user. Additional searches of different designated search providers can be made. These multiple searches of multiple search providers are conducted from the same browser window as the initial search. There is no requirement to surf the individual search provider sites in order to obtain search results from each site. A search provider manager is available to assist a user in tracking and managing the installed search providers. The returned search results provide in-depth and organized results as determined by the internal relevance manager.

BRIEF DESCRIPTION OF THE DRAWINGS

Illustrative embodiments of the invention are described in detail below, with reference to the attached drawing figures, which are incorporated by reference herein, and wherein.

DETAILED DESCRIPTION

Figure 1:
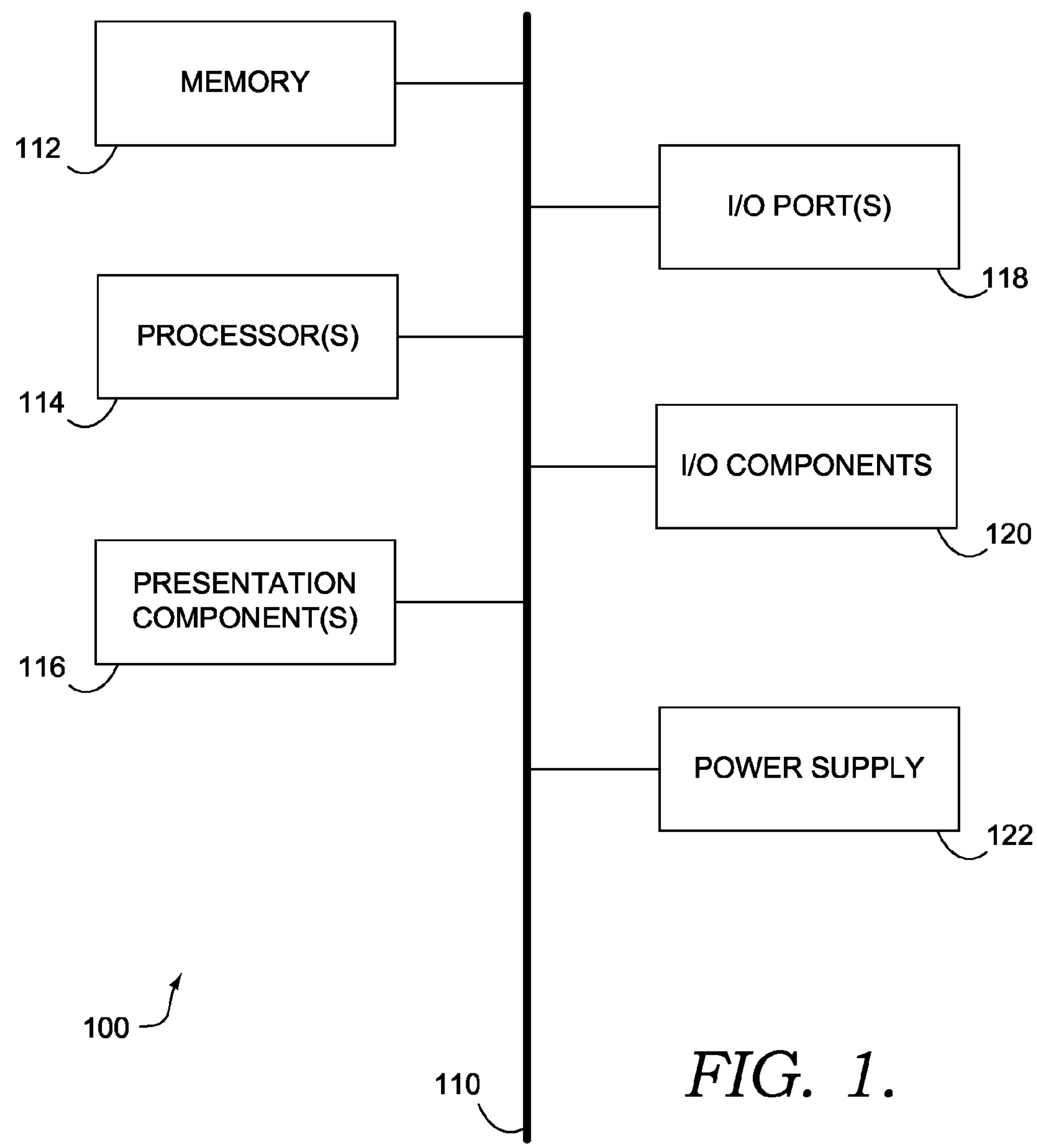
FIG. 1 is a block diagram illustrating an exemplary operating environment used in accordance with embodiments of the invention.

Embodiments of the invention provide systems, methods and computer-readable storage media for querying multiple search services in parallel and utilizing multiple search providers. This Detailed Description satisfies the applicable statutory requirements. The terms "step," "block," etc. might be used herein to connote different acts of methods employed, but the terms should not be interpreted as implying any particular order, unless the order of individual steps, blocks, etc. is explicitly described. Likewise, the term "module," etc. might be used herein to connote different components of systems employed, but the terms should not be interpreted as implying any particular order, unless the order of individual modules, etc. is explicitly described.

Throughout the description of different embodiments of the invention, several acronyms and shorthand notations are used to aid the understanding of certain concepts pertaining to the associated systems, methods and computer-readable media. These acronyms and shorthand notations are intended to help provide an easy methodology for communicating the ideas expressed herein and are not meant to limit the scope of any embodiment of the invention.

Embodiments of the invention include, without limitation, methods, systems, and sets of instructions embodied on one or more computer-readable media. Computer-readable media include both volatile and nonvolatile media, removable and non-removable media, and media readable by a database and various other network devices. Computer-readable media comprise computer storage media and communication media. By way of example, and not limitation, computer-readable media comprise media implemented in any method or technology for storing information. Examples of stored information include computer-useable instructions, data structures, program modules, and other data representations. Media examples include, but are not limited to, information-delivery media, random access memory (RAM), read-only memory (ROM), electrically erasable programmable read-only memory (EEPROM), flash memory or other memory technology, compact-disc read-only memory (CD-ROM), digital versatile discs (DVD), holographic media or other optical disc storage, magnetic cassettes, magnetic tape, magnetic disk storage, and other magnetic storage devices. These examples of media can be configured to store data momentarily, temporarily, or permanently. The computer readable media include cooperating or interconnected computer readable media, which exist exclusively on a processing system or distributed among multiple interconnected processing systems that may be local to, or remote from, the processing system. Communication media can be configured to embody computer-readable instructions, data structures, program modules or other data in an electronic data signal, and includes any information delivery media. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

An embodiment of the invention may be described in the general context of computer code or machine-useable instructions, including computer-executable instructions such as program modules, being executed by a computer or other machine. Generally, program modules including routines, programs, objects, components, data structures, and the like refer to code that perform particular tasks or implement particular data types. Embodiments described herein may be implemented using a variety of system configurations, including handheld devices, consumer electronics, general-purpose computers, more specialty computing devices, etc. Embodiments described herein may also be implemented in distributed computing environments, using remote-processing devices that are linked through a communications network.

In one embodiment, the present invention is directed to a method of utilizing multiple search services and providers in a computer system. The method includes providing a search box within a window of a browser, via a user interface of the computer system. A plurality of search providers selected by a user are installed onto the browser of the computer system. A search entry is received from the user into the search box. A designated search provider is received from the user, via a menu of the installed plurality of search providers. The search entry is searched within a domain of the designated search provider. An instant answer to the search entry is returned to the user without user intervention. Related search results are also returned via the user interface of the computer system.

In another embodiment, the present invention is directed to a computer-implemented system for utilizing multiple search services and providers in a computer system having a processor, memory and data storage subsystems. The computer system includes a search box contained within a window of a browser on a user interface of the computer system, wherein the search box is operative to receive a search entry from a user. A plurality of installed search providers are on the browser, wherein the plurality of installed search providers are selected by the user of the computer system, and are operative to perform a search using the search entry provided by the user. A designated search provider is selected from the plurality of installed search providers. A Uniform Resource Locator (URL) endpoint is operative to query multiple services in parallel to return an instant answer and aggregated results to the user. An internal relevance manager is operative to generate a match within a grammar context of a supported instant answer. Displayed search results are within the window of the browser on the user interface of the computer system, whereby the displayed search results are returned from the designated search provider. The displayed search results include results from any instant answer suggestion that matches the search entry, results from any search suggestions provided by the designated search provider, and results of any previously visited sites in which results of the previously visited site match the search entry.

In yet another embodiment, the present invention is directed to one or more computer-readable storage media containing computer readable instructions embodied thereon that, when executed by a computing device, perform a method of utilizing multiple search services and providers. The method includes providing a search box within a window of a browser, via a user interface of the computer system. A plurality of search providers selected by a user are installed onto the browser of the computer system. A search entry is received from the user into the search box. A first designated search provider is received from the user, via a menu of the installed plurality of search providers. The search entry is searched within a domain of the first designated search provider. A first instant answer to the search entry is returned without user intervention. First search results from the first designated search provider are also returned. A second designated search provider is received. The search entry is searched within a domain of the second designated search provider. A second instant answer to the search entry is returned without user intervention. Second search results are also returned from the second designated search provider. The first instant answer and the second instant answer results are displayed. The first search results and the second search results of any search suggestions provided by the first designated search provider and the second designated search provider, respectively are displayed. The first search results and the second search results of any previously visited sites in which results of the previously visited site match the search entry are displayed. Searching the search entry within a domain of the first designated search provider and searching the search entry within a domain of the second designated search provider are both completed without leaving the browser. The first designated search provider differs from the second designated search provider.

Having briefly described a general overview of the embodiments herein, an exemplary computing device is described below. Referring initially to FIG. 1, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated. In one embodiment, the computing device 100 is a conventional computer (e.g., a personal computer or laptop).

The computing device 100 includes a bus 110 that directly or indirectly couples the following devices: memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component 116 such as a display device to be an I/O component. Also, processors 114 have memory 112. It will be understood by those skilled in the art that such is the nature of the art, and as previously mentioned, the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1, and are referenced as "computing device."

The computing device 100 can include a variety of computer-readable media. By way of example, and not limitation, computer-readable media may comprise RAM, ROM, EEPROM, flash memory or other memory technologies, CDROM, DVD or other optical or holographic media, magnetic cassettes, magnetic tape, magnetic disk storage or other magnetic storage devices, or similar tangible media that are configurable to store data and/or instructions relevant to the embodiments described herein.

The memory 112 includes computer-storage media in the form of volatile and/or nonvolatile memory. The memory 112 may be removable, non-removable, or a combination thereof. Exemplary hardware devices include solid-state memory, hard drives, cache, optical-disc drives, etc. The computing device 100 includes one or more processors 114, which are operative to read data from various entities such as the memory 112 or the I/O components 120. The presentation component(s) 116 are operative to present data indications to a user or other device. Exemplary presentation components 116 include a display device, speaker, printing component, vibrating component, and the like.

The I/O ports 118 are operative to logically couple the computing device 100 to other devices including the I/O components 120, some of which may be built in. Illustrative I/O components 120 include a microphone, joystick, game pad, satellite dish, scanner, printer, wireless device, etc.

The components described above in relation to the computing device 100 may also be included in a wireless device. A wireless device, as described herein, refers to any type of wireless phone, handheld device, personal digital assistant (PDA), BlackBerry®, smartphone, digital camera, or other mobile devices (aside from a laptop), which are operable to communicate wirelessly. One skilled in the art will appreciate that wireless devices will also include a processor and computer-storage media, which are operable to perform various functions. Embodiments described herein are applicable to both a computing device and a mobile device. In embodiments, computing devices can also refer to devices which operate to run applications of which images are captured by the camera in a mobile device.

The computing system described above is configured to be used with multiple search provider system and method embodiments of the invention. Embodiments of the invention provide the means to utilize multiple search providers and obtain multiple search results from those providers, all from a single browser.

Figure 2A:
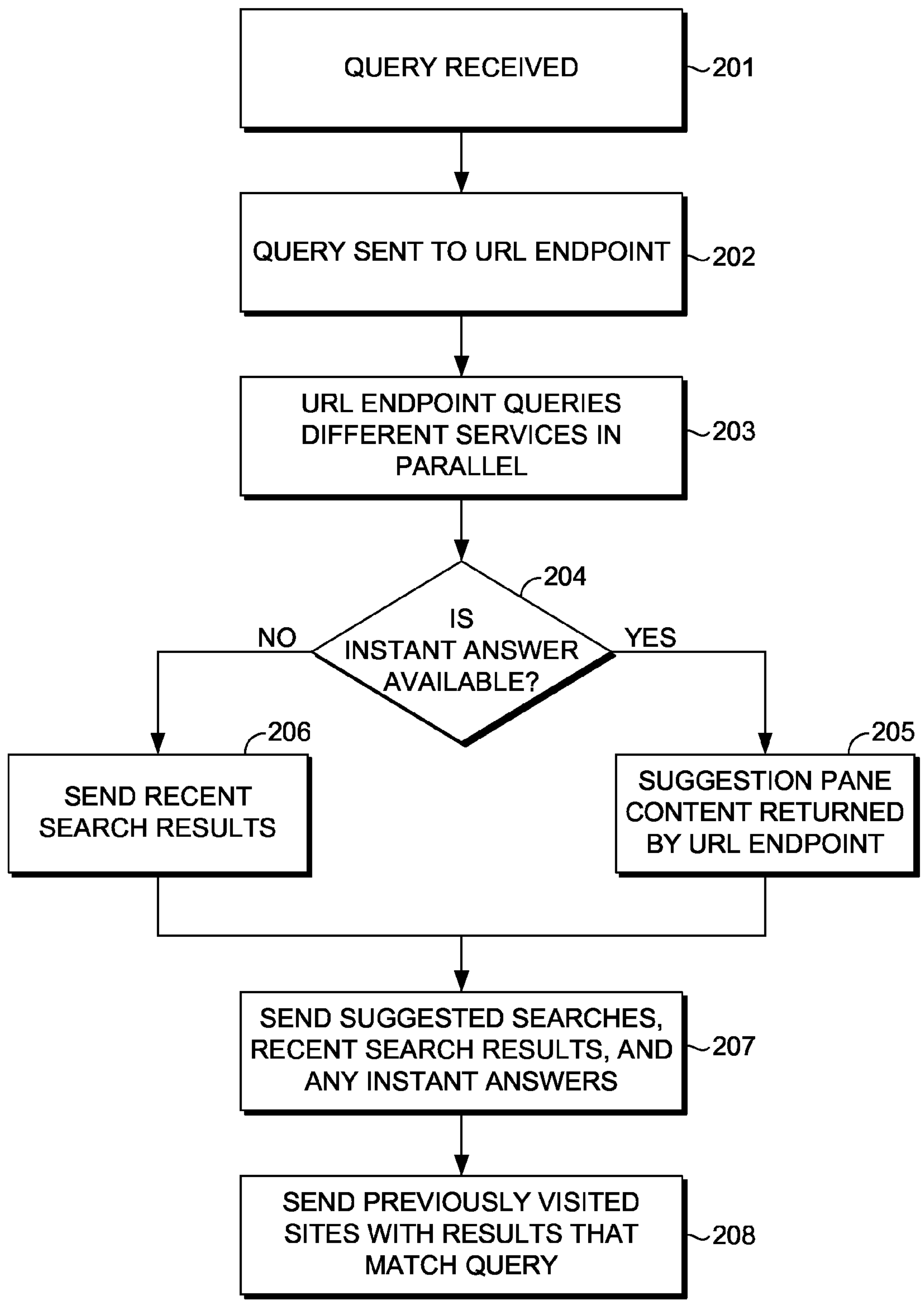
FIG. 2A is a flow diagram illustrating a method of obtaining an instant answer from a query.

FIG. 2A is a flow diagram illustrating an instant answer embodiment of the invention. A query is received from a user in step 201. A query could be either a partial or a complete query entry. As the query is entered, the query entry is sent to a URL endpoint, in step 202. A new query is sent to the search service with each additional keystroke entry. The URL endpoint queries several different services in parallel, in step 203. There is no need for multiple front end search engines. Everything is obtained from just one browser.

One of the available services is an instant answer service. An instant answer can be added, removed, or enhanced in response to search entry additions, deletions, or revisions, respectively without changing clients. An internal relevance manager determines a most relevant answer to provide a precise instant answer. The internal relevance manager matches the grammar of the query to known instant answers, to determine if an instant answer is available in step 204.

Figure 2B:
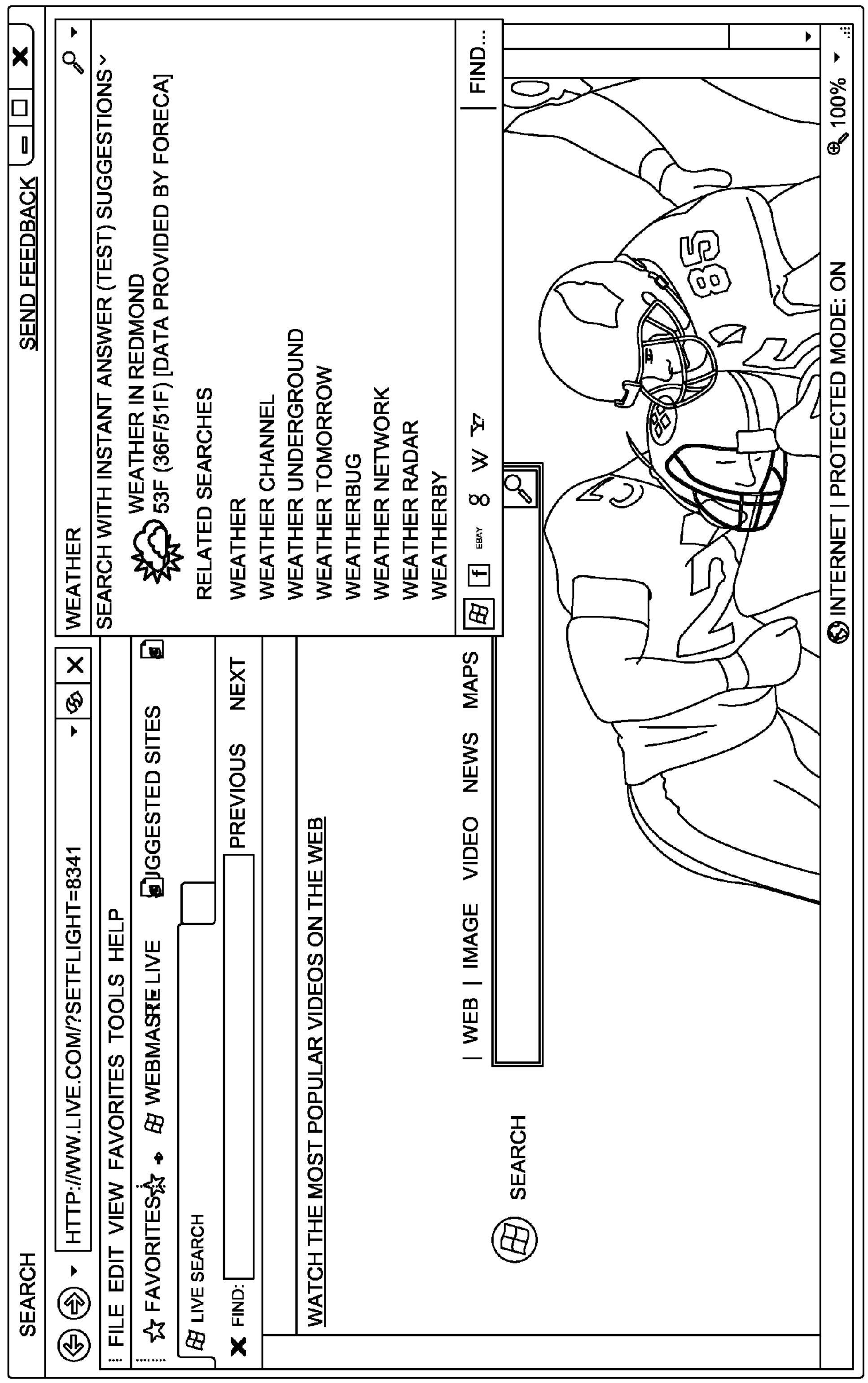
FIG. 2B is an illustration of an instant answer obtained from a query.

FIG. 2B illustrates how the instant answer service operates, for a specific example. In the FIG. 2B example, a query is received from a user for "weather". One of the available services of the URL endpoint could be a weather service entity. Therefore, as an example, the instant answer service may provide the weather forecast for the location of the user. In the FIG. 2B example, the user is located in Redmond, so the weather forecast for Redmond is automatically displayed as an instant answer. The instant answer is provided without requiring the user to make a selection from a list of search results, and without requiring the user to go to another site. Clicking on the instant answer will take the user to the data provider's page. In addition to the instant answer, related search results are given in the same pane, in the event that the user wishes to select other search results.

Figure 2C:
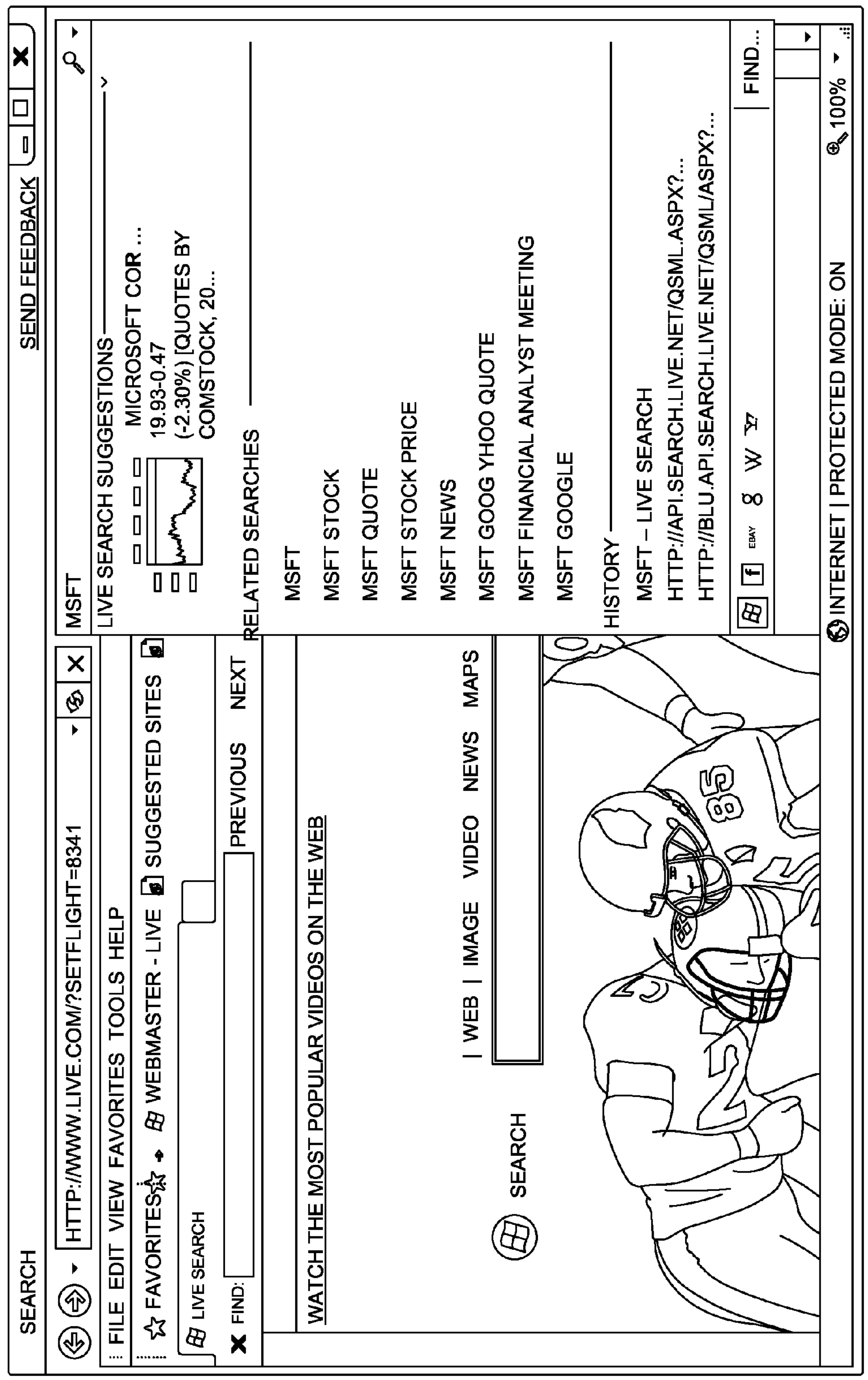
FIG. 2C is an illustration of an instant answer obtained from a query.

FIG. 2C illustrates another example, in which a search entry of "msft" is given. One of the available services of the URL endpoint could be a stock exchange reporting agency. Therefore, as an example, the instant answer service would provide the current stock information for Microsoft. If additional information on Microsoft stock is desired, the user can click on this instant answer, which will lead the user to the stock exchange reporting agency site. The instant answer is provided without requiring the user to make a selection from a list of search results, and without requiring the user to go to another site. Related search results and previously visited websites related to this particular search entry are also displayed in the given window pane.

Figure 2D:
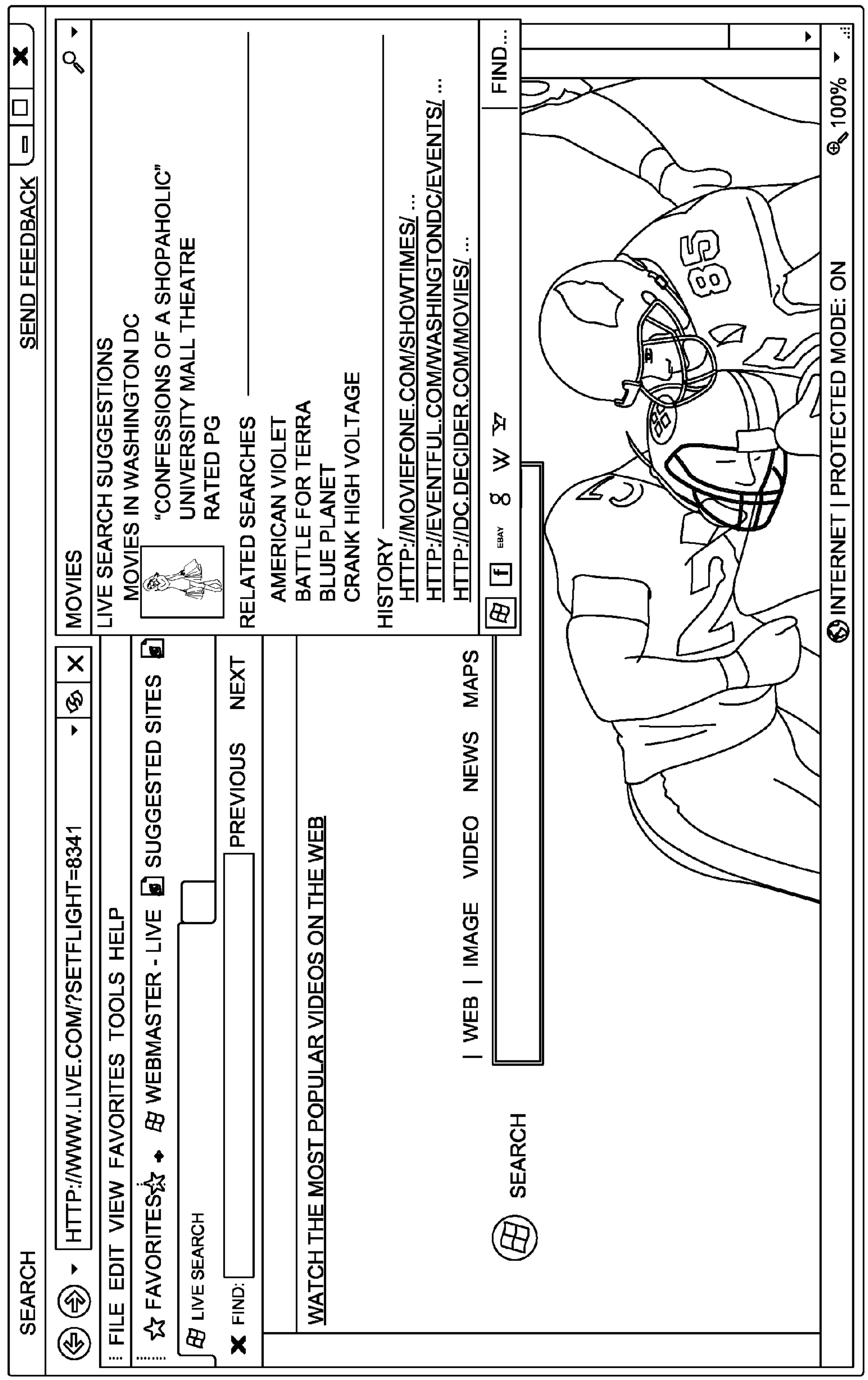
FIG. 2D is an illustration of an instant answer obtained from a query.

FIG. 2D illustrates another example, in which a search entry of "movies" is given. One of the available services of the URL endpoint could be a database service containing information on all movies currently playing. In FIG. 2D, the user is located in Washington, D.C. Therefore, a currently playing movie in Washington, D.C. is instantly displayed, along with location and rating information. In this example, "Confessions of a Shopaholic" is playing at the University Mall Theatre, and the movie is rated PG. Clicking on the instant answer will take the user to the data provider's page. Displayed results also include related searches, such as other movies currently playing in the Washington, D.C. area. Previously visited websites with search results which match the search entry are also displayed in the window pane.

Many other entities across a wide spectrum of subject matter could be used as a service of the URL endpoint. Any and all such variations, and any combination thereof, are contemplated to be within the scope of embodiments of the present invention.

Referring back to FIG. 2A, if there is an instant answer available, then the content from the instant answer service is returned by the URL endpoint to the user in a suggestion pane, in step 205. The instant answer is displayed automatically. Clicking upon the instant answer will take the user to the data provider's page for more information. If there is no instant answer available, then a list of recent search results are returned to the user in step 206. Step 207 aggregates all of the results from any instant answers, suggested searches, and recent search results, and sends the aggregated results to the user. Previously visited sites with results that match the query are also returned to the user in step 208. A more detailed explanation of how the results are returned to the user will be given subsequently.

Figure 2E:
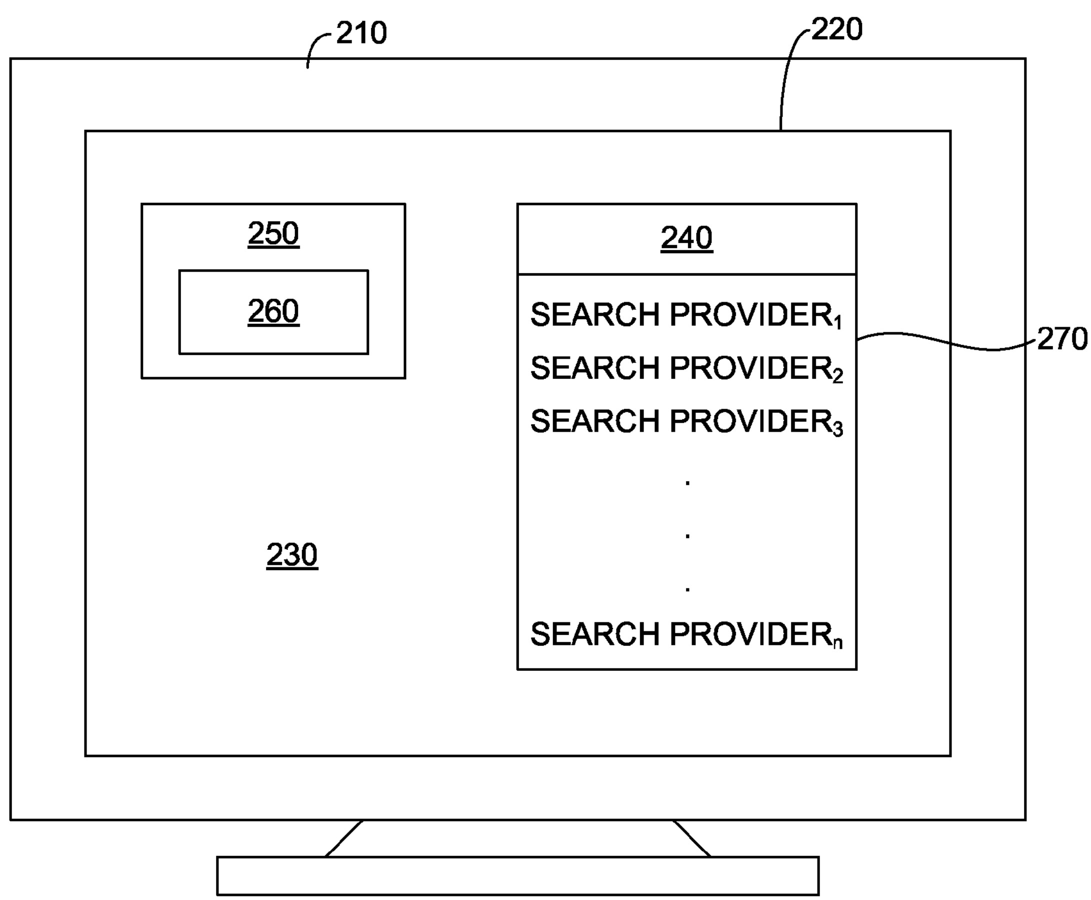
FIG. 2E is an illustration of a computer-implemented system for utilizing multiple search providers, in accordance with embodiments of the invention.

FIG. 2E is an illustration of a computer-implemented system for utilizing multiple search providers in a computer system, such as the computer system described above with reference to FIG. 1. A computer system used with embodiments of the invention may include a display screen 210. The display screen 210 employs a user interface 220, by which a user can interact with a hosting search provider, also known as a search engine, at a specific website. A particular host can be reached through an interconnected computing network, such as the Internet, LAN, or a wide area network (WAN). A specific electronic address, such as a URL, can be used in order to connect a user to a specific host from a large pool of hosts available on the WWW.

In an embodiment of the computer-implemented system, a browser window 230 is utilized in order to interact with one or more search providers 240 for the purpose of performing a search. A search box 250 is provided in the browser window 230 to enable a user to input a search query 260. A URL endpoint operates within the system to query a plurality of services in parallel, in order to return an instant answer and aggregated results. The search engine for this service is on the back end; the service does not require multiple front end search engines. An internal relevance manager is part of the system, which operates to generate a match within the grammar of a supported instant answer. The generated match is a precise answer, and not just a related result.

An embodiment is provided for a user to install a number of search providers 240. An installed search provider 240 provides a link to a web server of that particular search provider 240. The installation of search providers 240 can be made by a user, via an "Add Search Provider" embodiment. In order to install a new search provider 240 to the user's search provider list, the user can go to that search provider's web site. If a link exists on the search provider's web site for selection as an installed search provider 240, then the user simply clicks on the link, and then confirms the selection. However, a direct link may not be available for some search providers 240. An alternative embodiment provides a widget, whereby a user can manually select a search provider 240 to add to the user's installed search provider list. Another alternative embodiment provides a pre-selected list of search providers 240 that the user can select from, to add to the user's installed search provider list. A user's list of installed search providers is illustrated in a drop-down menu 270 in FIG. 2E.

A search manager embodiment is also provided, whereby several search provider management features are available for use with the installed search providers 240. These search provider management features include, but are not limited to, changing an order of the menu listing of installed search providers 240, designating one of the installed search providers 240 as a default search provider 240, removing one of the installed search providers 240, and changing one or more attributes of an installed search provider 240.

After a search query 260 has been entered into the search box 250 and a search provider 240 has been designated from the drop-down menu 270, search results are then obtained from the designated search provider 240. Embodiments of the invention also provide for designation of another search provider 240, using either the same or a different search query 260, without leaving the browser. Therefore, searching across several search providers 240 is possible from the same browser window 230.

Figure 3:
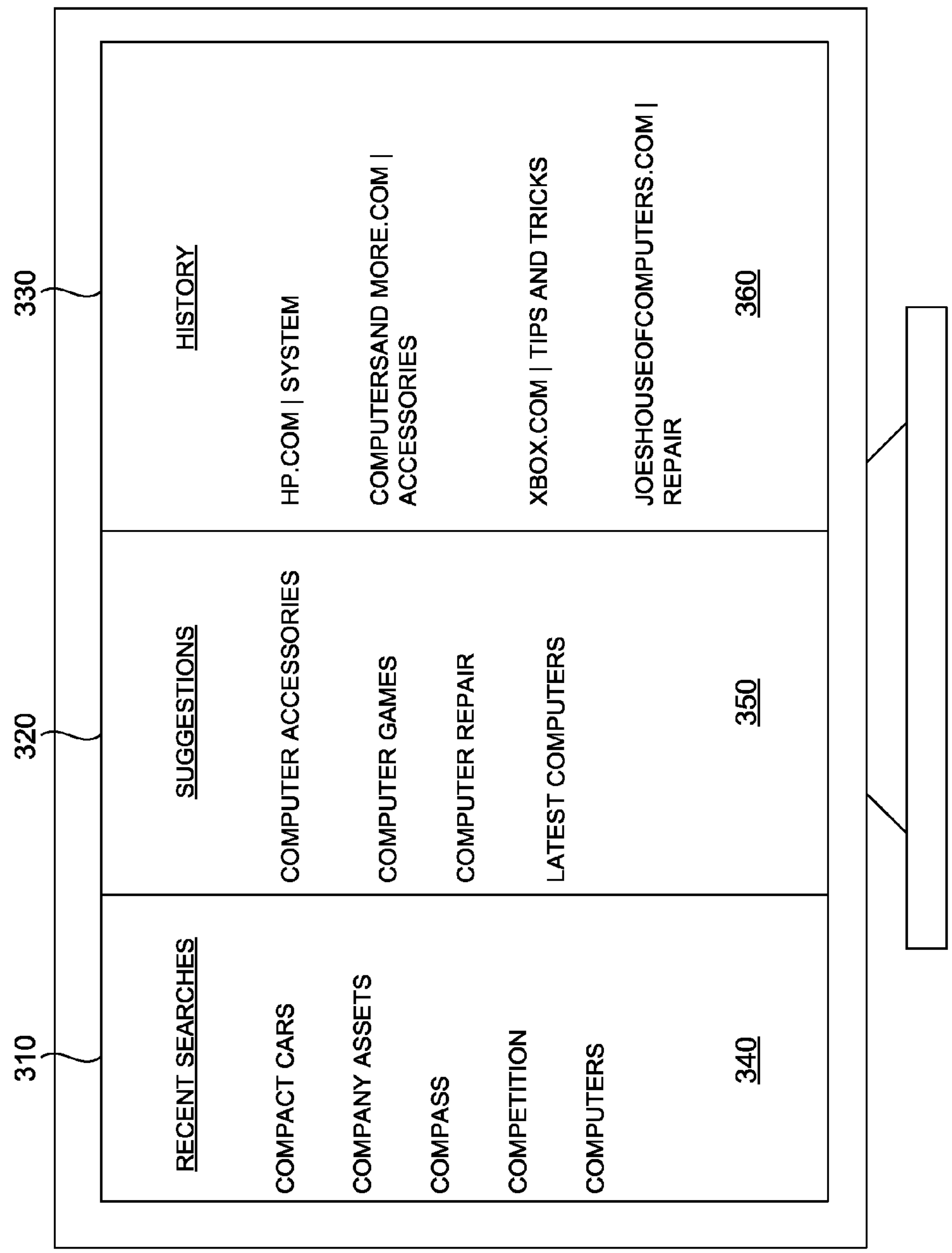
FIG. 3 is an illustration of a computer-implemented system for utilizing multiple search providers, in accordance with embodiments of the invention.

FIG. 3 illustrates an example of search results on a display screen 310, which are displayed within a browser window 330 on the user interface 320 of a computer system, such as the computer system described above with reference to FIG. 1. The browser window 330 in FIG. 3 illustrates search results, which are divided into three sections. A first section containing recent searches 340 is displayed, which shows recent searches which match the inputted search query 260. As an example, if a search query 260 of "comp" is entered, then results of compact cars, company assets, compass, competition, and computers may be returned from the domain of the selected search provider 240. In addition to results from recent searches 340, a second section is displayed containing suggestions 350, which are provided by the selected search provider 240. If the selected search provider 240 supports search suggestions, then search suggestions appear as the search query 260 is typed. This embodiment enables a selected search provider 240 to also display a visual suggestion, such as a small image and text as part of the suggestion. A third section containing history 360 is displayed. The history section 360 lists any previously visited sites which show web site titles and URLs that match the current search query. Matching terms are highlighted.

In addition to entering a search query 260 into the search box 250, other embodiments for searching are also provided. In one embodiment, text from a displayed screen can be highlighted for searching. When the text is highlighted, an icon is displayed with the list of installed search providers 240. A specific search provider 240 can then be designated to produce new search results, such as the results illustrated in FIG. 3.

Another embodiment provides previewed search results. Text from a displayed web page is highlighted, then the icon of installed search providers 240 is displayed. If a search provider 240 supports search preview, then search results from a search provider 240 will be displayed in a preview window when a mouse hovers over that search provider's name.

An embodiment for finding a term on a page is also provided as an added feature to the previously described searching embodiments. When this feature is selected, the term or terms within the search query are highlighted on the currently displayed page. The total number of matches found is also displayed.

Figure 4:
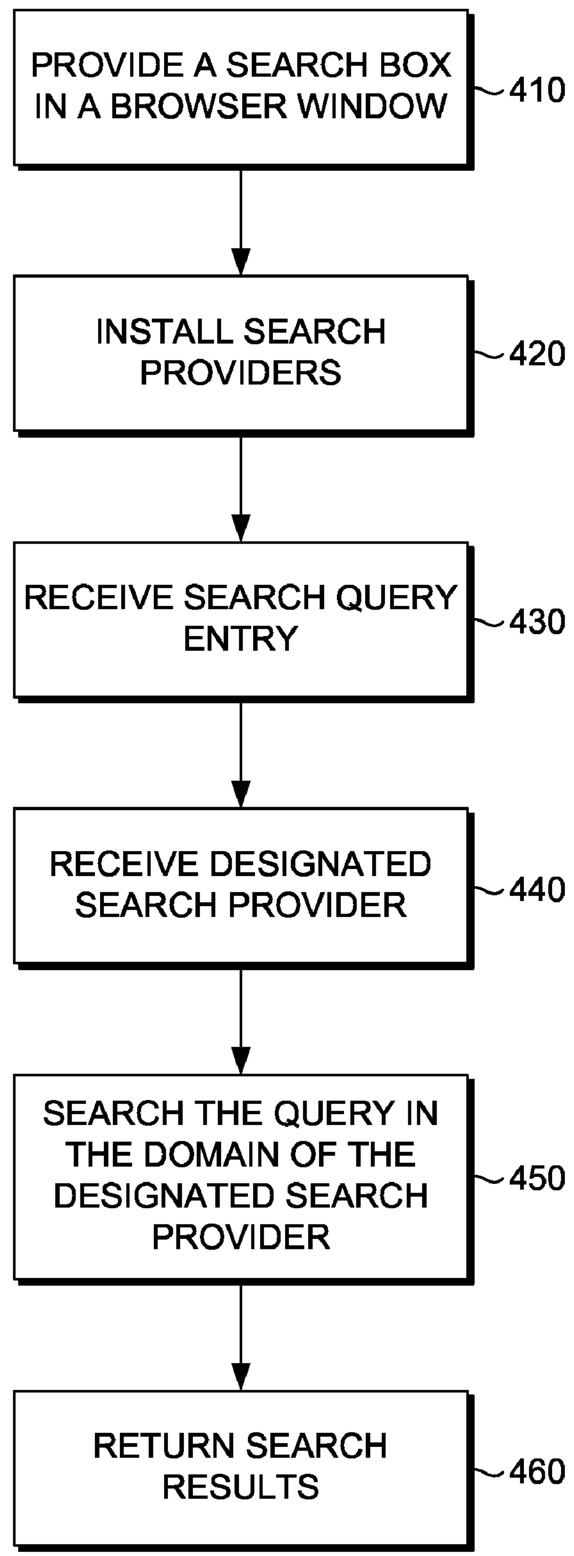
FIG. 4 is a flow diagram illustrating a method of utilizing multiple search providers, in accordance with an embodiment of the invention.

A method of utilizing multiple search services and providers will be described with reference to the flow diagram of FIG. 4. A search box is provided within a window of a browser in step 410. The browser is provided by means of a user interface of a computer system, such as the computer system described above with reference to FIG. 1. One or more search providers, selected by a user, are installed onto the browser in step 420. The installation of each search provider provides a link to a web server of that search provider. A prospective list of search providers can also be provided to the user to assist in installing the desired search providers. A search entry is received from the user into the search query box in step 430; a designated search provider is received from the user in step 440. The designated search provider is selected from a menu listing all of the installed search providers for the user. The search entry, provided by the user, is searched within the domain of the designated search provider in step 450. A second search provider could be designated, then searching of the search entry would be conducted again within the domain of the second designated search provider. This step can be repeated for additional search providers. An instant answer and all of the aggregated search results are then returned to the user via the user interface in step 460. The displayed results contain a somewhat detailed instant answer, such as those described above with reference to FIGS. 2B, 2C, and 2D. Aggregated results for each search are also displayed. These include results from any recent searches that match the search entry, along with search suggestions provided by the designated search provider, as well as results from any previously visited sites in which results of those previously visited sites match the search entry. These sets of results can be displayed in respective sections within a single browser window.

Figure 5:
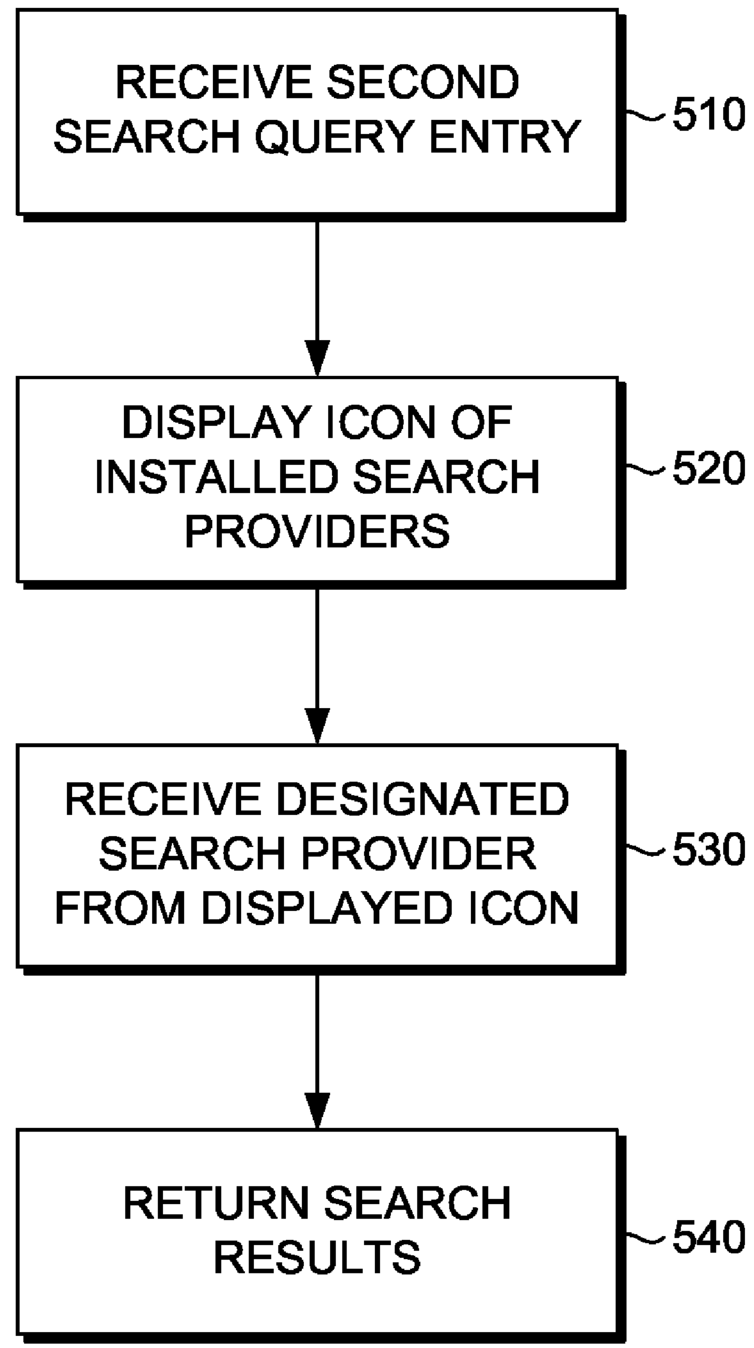
FIG. 5 is a flow diagram illustrating a method of utilizing multiple search providers, in accordance with an embodiment of the invention.

As previously described above, searches can also be performed using alternative embodiments. With reference to the flow diagram of FIG. 5, a search query is received from a user via a highlighted portion of a displayed page in the browser window, illustrated as step 510. Upon receipt of the search query in step 510, an icon is displayed to the user, listing all of the installed search providers for that user in step 520. A search provider, designated by the user from the list of installed search providers via a displayed icon is received in step 530. Results of the search query from searching the domain of the designated search provider are then returned to the user in step 540.

Figure 6:
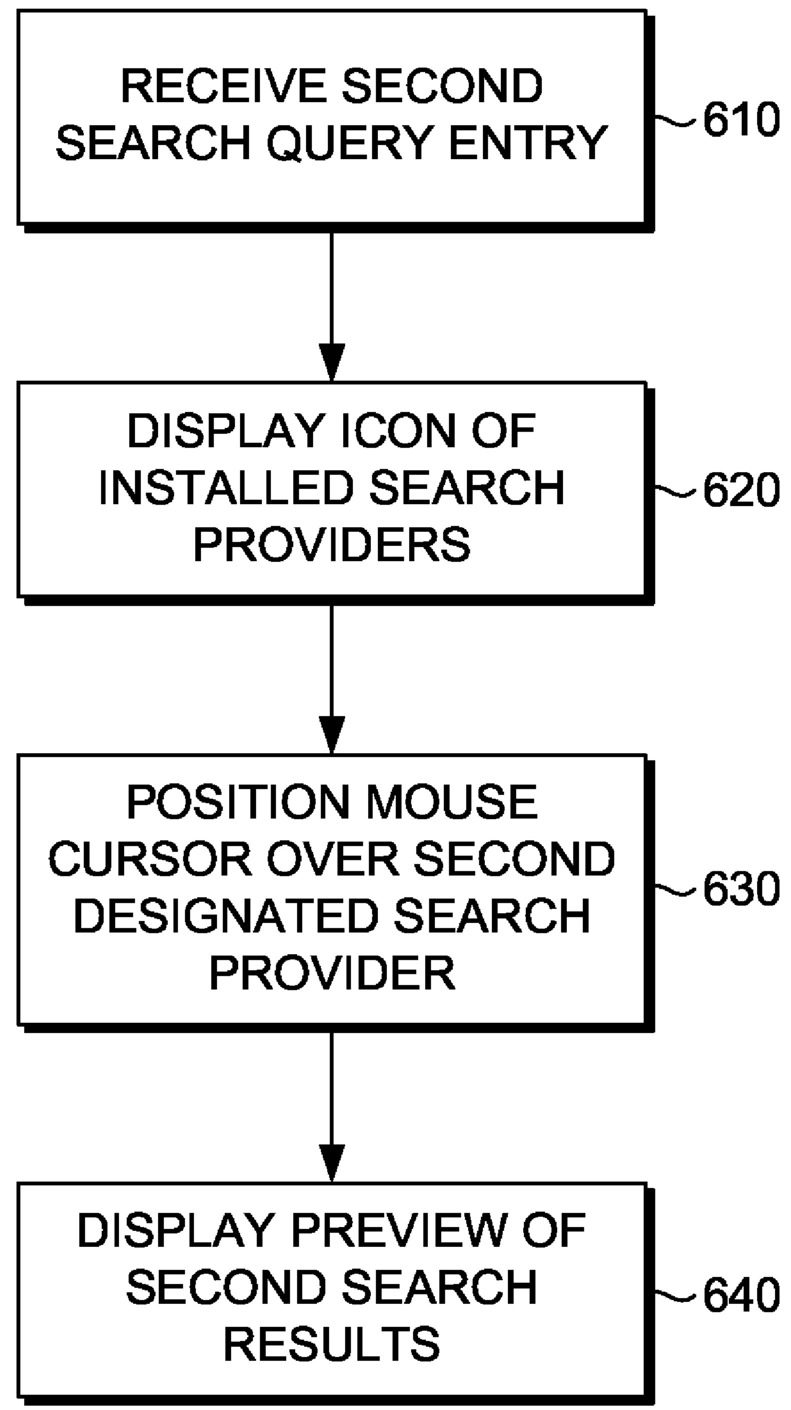
FIG. 6 is a flow diagram illustrating a method of utilizing multiple search providers, in accordance with an embodiment of the invention.

Another alternative embodiment is illustrated in the flow diagram of FIG. 6. A search query is received via a highlighted portion of a displayed page in the browser window, illustrated as step 610. An icon of the installed search providers is displayed to the user in step 620. A designated search provider is received in response to a mouse cursor hovering over the designated search provider name, illustrated as step 630. A preview of search results from that designated search provider is displayed, illustrated as step 640.

The flow diagrams of FIGS. 2A, 4, 5, and 6 also illustrate steps performed for one or more computer-readable storage media containing computer readable instructions embodied thereon that, when executed by a computing device, perform a method of utilizing multiple search services and providers.

Figure 7:
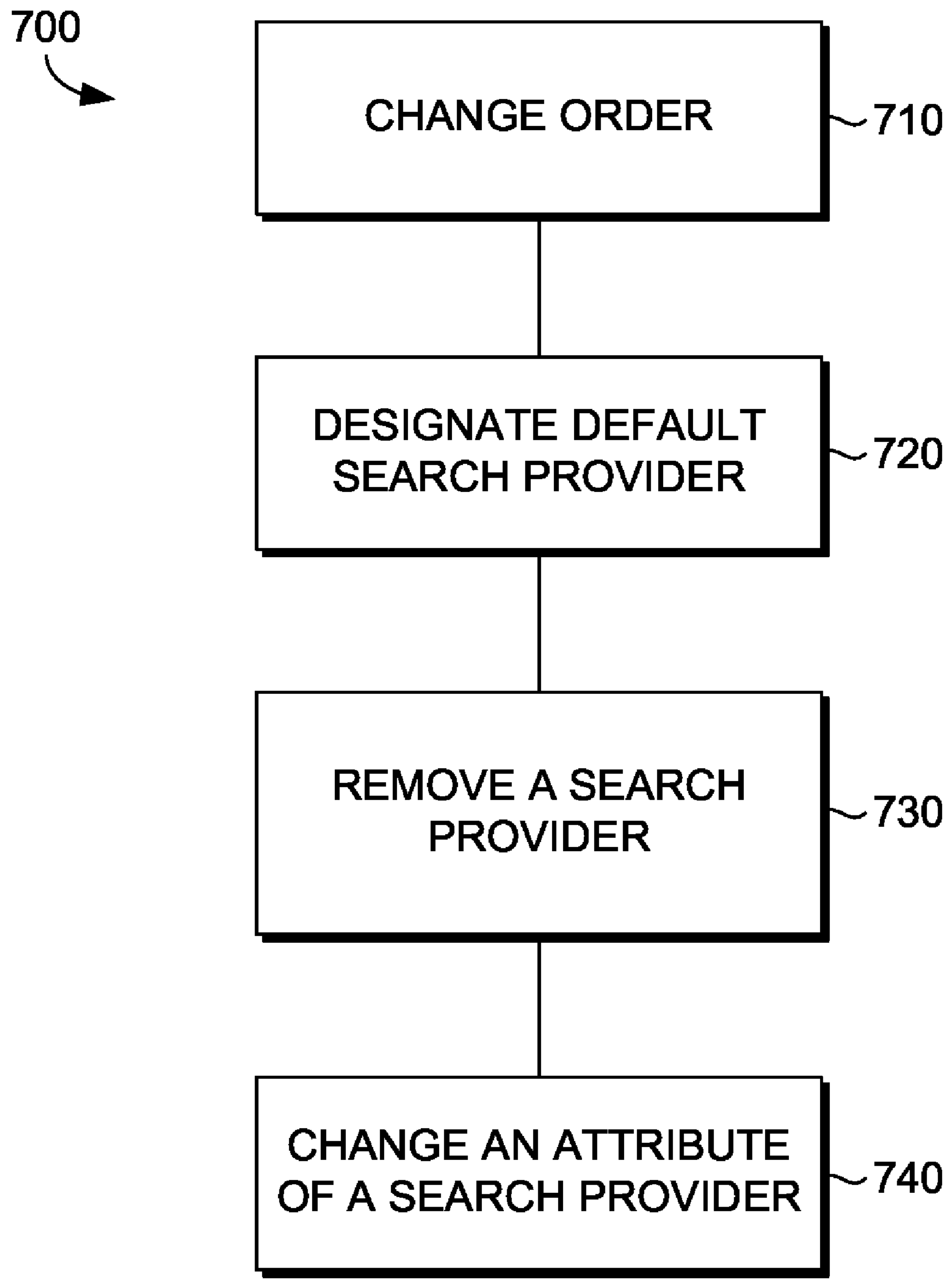
FIG. 7 is an illustration of a feature used in accordance with an embodiment of the invention.

An additional embodiment of the invention includes managing the installed search providers, as illustrated in FIG. 7. The search provider manager 700 includes a feature, whereby the listed order of installed search providers can be changed, and is illustrated as feature 710. The list of installed search providers can be arranged alphabetically, or according to frequency of use, to name just a few of the available options. The search provider manager 700 can also be used to designate a different default search provider, which is illustrated as feature 720. Another available feature of the search provider manager 700 is removing a search provider, illustrated as feature 730. One or more attributes of a search provider can be changed, and is illustrated as feature 740. Many other features could be used in order to assist a user in managing his/her installed search providers. Any and all such variations, and any combination thereof, are contemplated to be within the scope of embodiments of the present invention.

Many different arrangements of the various components depicted, as well as embodiments not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the embodiments of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method of utilizing multiple search services and providers in a computer system having a processor, memory and data storage subsystems, comprising:

providing a search box within a window of a browser, via a user interface of the computer system;

installing a plurality of search providers selected by a user onto the browser of the computer system;

receiving a search entry from the user into the search box;

receiving a designated search provider from the user, via a menu of the installed plurality of search providers;

searching the search entry within a domain of the designated search provider;

returning an instant answer to the search entry without user intervention via the user interface of the computer system;

returning related search results via the user interface of the computer system, comprising results of any recent searches, results of search suggestions provided by the designated search provider, and results of any previously visited sites that match the search entry; and managing the installed plurality of search providers, wherein the managing comprises one of, changing an order of the menu of the installed plurality of search providers, designating one of the installed plurality of search providers as a default search provider, removing one of the installed plurality of search providers, and changing one of the installed plurality of search providers attributes.

2. The computer-implemented method of claim 1, wherein the searching comprises searching multiple search services in parallel.

3. The computer-implemented method of claim 2, wherein the returning an instant answer comprises determining a most relevant answer, via an internal relevance manager.

4. The computer-implemented method of claim 1, further comprising, searching the search entry again, after receiving a different designated search provider, without leaving the browser.

5. The computer-implemented method of claim 1, wherein the returning search results comprises:

displaying results of any instant answer suggestion that match the search entry;

displaying results of any search suggestions provided by the designated search provider; and displaying results of any previously visited sites in which results of the previously visited site match the search entry.

6. The computer-implemented method of claim 5, wherein the returning search results is displayed in a single window comprising respective individual sections for the displaying results of any recent searches, the displaying results of any search suggestions, and the displaying results of any previously visited sites.

7. The computer-implemented method of claim 1, further comprising:

receiving a second search entry via a highlighted portion of a displayed page in the window of the browser;

displaying an icon listing the installed plurality of search providers;

receiving a designated search provider via the displaying an icon; and returning search results from the selected search provider for the second search entry.

8. The computer-implemented method of claim 1, further comprising:

receiving a second search entry via a highlighted portion of a displayed page in the window of the browser;

displaying an icon listing the installed plurality of search providers;

receiving a second designated search provider via a positioning of a mouse cursor over the second designated search provider from the displaying an icon; and displaying a preview of second search results from the second designated search provider for the second search entry.

9. The computer-implemented method of claim 1, further comprising, providing a prospective list of search providers to the user to assist in the installing a plurality of search providers.

10. A computer-implemented system for utilizing multiple search services and providers in a computer system having a processor, memory and data storage subsystems, comprising:

a search box contained within a window of a browser on a user interface of the computer system, the search box operative to receive a search entry from a user;

a plurality of installed search providers on the browser, the plurality of installed search providers selected by the user of the computer system to perform a search using the search entry provided by the user;

an icon listing the plurality of installed search providers;

a designated search provider, selected from the plurality of installed search providers;

a URL endpoint to query a plurality of services in parallel and to return an instant answer and aggregated results to the user;

an internal relevance manager to generate a match within a grammar context of a supported instant answer;

search results from a search of a highlighted portion of a displayed page, via a selected one of the plurality of installed search providers from the icon listing; and displayed search results within the window of the browser on the user interface of the computer system, the displayed search results returned from the designated search provider, wherein the displayed search results comprise:

results from any instant answer suggestion that match the search entry;

results from any search suggestions provided by the designated search provider; and results of any previously visited sites in which results of the previously visited site match the search entry.

11. The system of claim 10, wherein each of the plurality of installed search providers comprises a link to a web server of each respective plurality of installed search provider.

12. The system of claim 10, further comprising sequential designated search providers to provide corresponding sequential search results without leaving the browser.

13. The system of claim 10, wherein the search box comprises a single window for the displayed search results, and wherein separate sections within the single window respectively comprise:

the results from any recent searches;

the results from any search suggestions; and the results of any previously visited sites.

14. The system of claim 10, further comprising:

an icon listing the plurality of installed search providers; and a preview of search results from a search of a highlighted portion of a displayed page via a selected one of the plurality of installed search providers, the preview displayed in response to a mouse cursor positioned over the selected one of the plurality of installed search providers from the icon listing.

15. One or more computer-readable storage media containing computer readable instructions embodied thereon that, when executed by a computing device, perform a method of utilizing multiple search services and providers, the method comprising:

providing a search box within a window of a browser, via a user interface of the computing device;

installing a plurality of search providers selected by a user onto the browser of the computer system;

receiving a search entry from the user into the search box;

receiving a first designated search provider from the user, via a menu of the installed plurality of search providers;

searching the search entry within a domain of the first designated search provider;

returning a first instant answer to the search entry without user intervention via the user interface of the computing device;

returning first search results from the first designated search provider;

receiving a second designated search provider;

searching the search entry within a domain of the second designated search provider using multiple search services in parallel;

returning a second instant answer to the search entry without user intervention via the user interface of the computing device;

returning second search results from the second designated search provider;

displaying the first instant answer results and the second instant answer results that match the search entry;

displaying the first search results and the second search results of any search suggestions provided by the first designated search provider and the second designated search provider, respectively; and displaying the first search results and the second search results of any previously visited sites in which results of the previously visited site match the search entry, wherein searching the search entry within a domain of the first designated search provider and searching the search entry within a domain of the second designated search provider are searched in parallel without leaving the browser, and wherein the first designated search provider differs from the second designated search provider.

16. The one or more computer-readable storage media of claim 15, wherein the returning the first instant answer and the returning the second instant answer comprise determining a most relevant answer, via an internal relevance manager.

17. The one or more computer-readable storage media of claim 15, further comprising managing the installed plurality of search providers via one of, changing an order of the menu of the installed plurality of search providers, designating one of the installed plurality of search providers as a default search provider, removing one of the installed plurality of search providers, and changing one of the installed plurality of search providers attributes.

* * * * *